United States Patent
Halpern

(10) Patent No.: US 9,288,106 B2
(45) Date of Patent: Mar. 15, 2016

(54) ADDING DEVICE-WIDE CAPABILITIES AND PARAMETERS TO SPLIT-ARCHITECTURE DEVICES

(71) Applicant: TELEFONAKTIEBOLAGET L M ERICSSON (PUBL), Stockholm (SE)

(72) Inventor: Joel Halpern, Leesburg, VA (US)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 804 days.

(21) Appl. No.: 13/667,875

(22) Filed: Nov. 2, 2012

(65) Prior Publication Data
US 2014/0129687 A1    May 8, 2014

(51) Int. Cl.
*G06F 15/177* (2006.01)
*H04L 12/40* (2006.01)
*H04L 12/28* (2006.01)
*H04L 12/24* (2006.01)
*H04L 12/751* (2013.01)
*H04L 12/851* (2013.01)
*H04L 29/06* (2006.01)

(52) U.S. Cl.
CPC ........ *H04L 41/0806* (2013.01); *H04L 41/0803* (2013.01); *H04L 41/0813* (2013.01); *H04L 41/0853* (2013.01); *H04L 41/12* (2013.01); *H04L 45/02* (2013.01); *H04L 47/2441* (2013.01); *H04L 69/24* (2013.01)

(58) Field of Classification Search
CPC ..... H04L 41/12; H04L 41/0803; H04L 45/02; H04L 41/0813; H04L 41/08; H04L 41/0853
USPC .................................. 709/221; 370/438, 254
See application file for complete search history.

(56) References Cited

U.S. PATENT DOCUMENTS

| 2004/0165601 | A1* | 8/2004 | Liu ......................... H04L 45/00 370/401 |
| 2005/0190783 | A1* | 9/2005 | Khosravi ................ H04L 69/24 370/438 |
| 2005/0201412 | A1* | 9/2005 | Philippe Janneteau ............. H04W 28/24 370/464 |

(Continued)

OTHER PUBLICATIONS

Halpern J. et al., IETF RFC 5812, "Forwarding and Control Element Separation (ForCES) Forwarding Element Model", Mar. 2010, the whole document.
Doria A. et al., IETF RFC 5810, "Forwarding and Control Element Separation (ForCES) Protocol Specification", Mar. 2010, the whole document.

(Continued)

*Primary Examiner* — Glenton B Burgess
*Assistant Examiner* — Imran Moorad

(57) ABSTRACT

A network element and process determines and configures capabilities of network element components. The network element components include a set of control elements where the set of control elements determine capabilities of each of a set of forwarding elements. The method includes initiating communication with a forwarding element in the set of forwarding elements by a control element. The control element requests that the forwarding element to provide a set of logical function block identifiers of supported logical function blocks for the forwarding element. The set of logical function block identifiers is then received from the forwarding element in response to the request. The set of logical function block identifiers are matched with known forwarding element capabilities to determine capabilities of the forwarding element. A forwarding element capability model is then updated with the capabilities of the forwarding element.

14 Claims, 2 Drawing Sheets

(56) References Cited

U.S. PATENT DOCUMENTS

2013/0128746 A1* 5/2013 Yedavalli ............... H04L 45/38
370/238
2013/0230047 A1* 9/2013 Subrahmaniam ... H04L 47/2441
370/392

OTHER PUBLICATIONS

Dong L. et al., "Definition and Implementation of Logical Function Blocks Compliant to ForCES Specification", Networks, 2007. ICON 2007. 15th IEEE International Conference on, IEEE, PI, Nov. 1, 2007, pp. 531-536, XP031211135.

Haleplidis E. et al., "Forwarding and Control Element Separation (ForCES) OpenFlow Model Library; draft-haleplidis-forces-openflow-lib-02", Internet Engineering Task Force, IETF;Standard Working Draft, Internet Society (ISOC) 4, Rue Des Falaises CH—1205 Geneva, Switzerl, Oct. 22, 2012, pp. 1-104.

Joachimpillai D., "ForCES Inter-FE LFB; draft-joachimpillai-forces-interfelfb-00", Internet Engineering Task Force, IETF; Standard Working Draft, Internet Society (ISOC) 4, Rue Des Falaises CH—1205 Geneva, Switzerland, Oct. 11, 2012, pp. 1-16.

* cited by examiner

ADDING DEVICE-WIDE CAPABILITIES AND PARAMETERS TO SPLIT-ARCHITECTURE DEVICES

FIELD

Embodiments of the invention relate to the field of network element configuration; and more specifically, to forwarding element capability determination by a control element in the network element having a split architecture.

BACKGROUND

Routers, bridges and similar network elements implement numerous functions that enable the communication of data from one end of a network to another end of the network. The functions performed by these network elements can encompass functions related to high level control such as configuration of the network element and basic data forwarding. This division of functions is often described as the handling of data in separate planes, a control plane and a data plane.

This division can also be manifest in the architecture of the network elements. The data plane functionality can be largely implemented in a set of components referred to as forwarding elements. Whereas, the control plane functionality can be largely implemented in a set of components referred to as control elements. Network elements with such discrete division of hardware components are often described as having a split-architecture. The control elements and forwarding elements are often implemented as separate line cards. A line card is a discrete component that is removably coupled to the network element. The network element can include any number of these line cards allowing it to scale to handle a large number of network connections. The network element can include multiple control elements and their corresponding line cards to provide distributed control plane implementation or redundant back up in the control plane. Line cards can be replaced to improve the capabilities of the network elements. Line cards are also capable of having their software and hardware upgrade enabling them to take on new capabilities without having the change the line card.

SUMMARY

A network element and process determines and configures capabilities of network element components. The network element components include a set of control elements where the set of control elements determine capabilities of each of a set of forwarding elements. The method includes initiating communication with a forwarding element in the set of forwarding elements by a control element. The control element requests that the forwarding element to provide a set of logical function block identifiers of supported logical function blocks for the forwarding element. The set of logical function block identifiers is then received from the forwarding element in response to the request. The set of logical function block identifiers are matched with known forwarding element capabilities to determine capabilities of the forwarding element. A forwarding element capability model is then updated with the capabilities of the forwarding element.

A network element implements a process for determining and configuring of capabilities of network element components. The network element components include a set of control elements where the set of control elements determines capabilities of each of a set of forwarding elements. The network element further includes a memory to store a forwarding element capabilities model, the forwarding elements capabilities module to store capabilities of each forwarding element in the set of forwarding elements and a processor coupled to the memory the processor to execute a forwarding element capability management module. The forwarding element capability management module initiates communication with a forwarding element in the set of forwarding elements. The forwarding element capability management module also requests that the forwarding element provide a set of logical function block identifiers of supported logical function blocks for the forwarding element. The forwarding element capability management module then receives the set of logical function block identifiers from the forwarding element in response to the request, to match the set of logical function block identifiers with known forwarding element capabilities to determine capabilities of the forwarding element, and updates a forwarding element capability model with the capabilities of the forwarding element.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
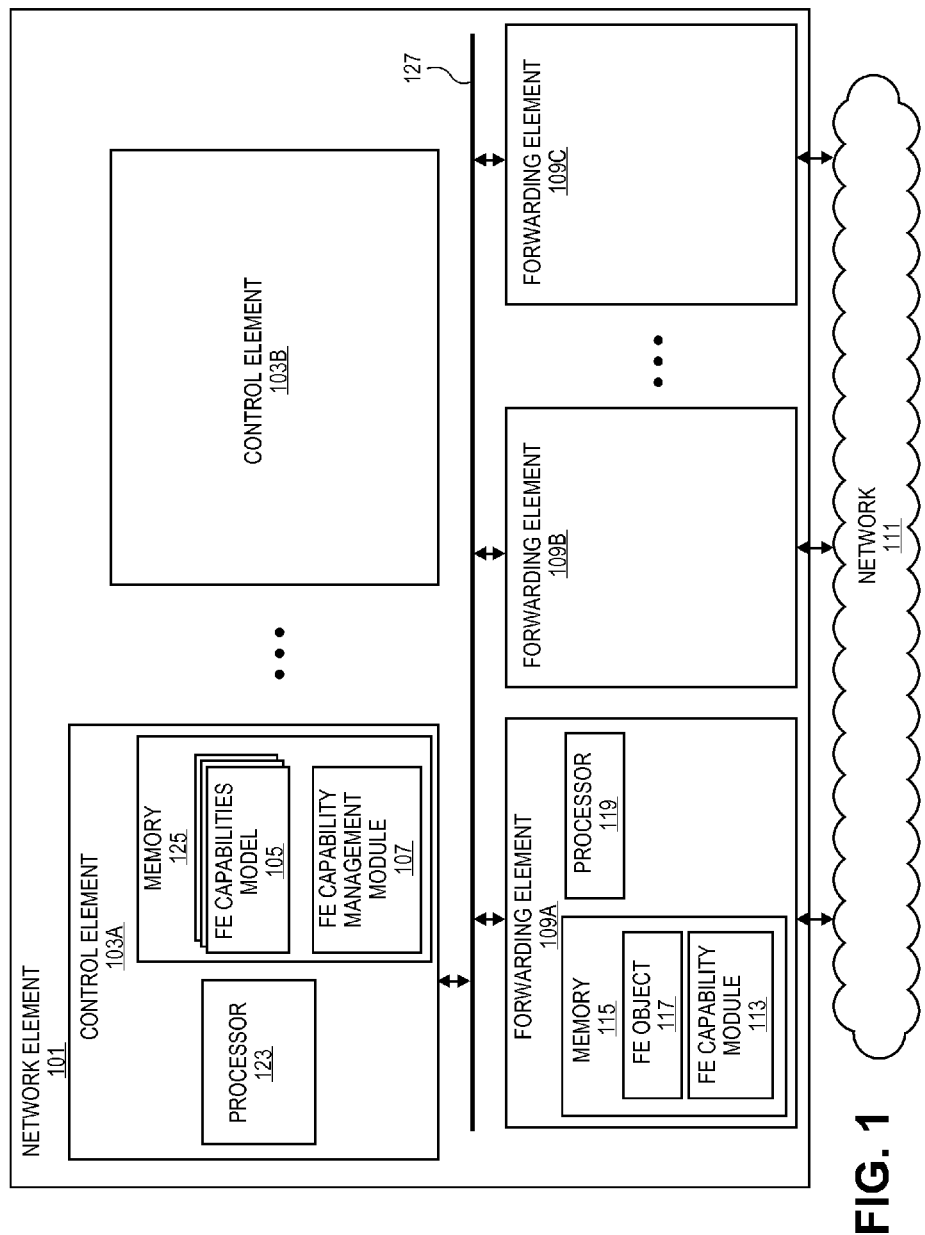
FIG. 1 is a diagram of one embodiment of a network element with a split-architecture.

The following description describes methods and apparatus for split-architecture capabilities management. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

To ease understanding, dashed lines have been used in the figures to signify the optional nature of certain items (e.g., features not supported by a given implementation of the invention; features supported by a given implementation, but used in some situations and not in others).

The techniques shown in the figures can be implemented using code and data stored and executed on one or more electronic devices. Such electronic devices store and communicate (internally and/or with other electronic devices over a network) code and data using non-transitory tangible computer-readable storage medium (e.g., magnetic disks; optical disks; read only memory; flash memory devices; phase-change memory) and transitory computer-readable communication medium (e.g., electrical, optical, acoustical or other forms of propagated signals-such as carrier waves, infrared signals, digital signals, etc.). In addition, such electronic devices typically include a set or one or more processors coupled with one or more other components, such as a storage device, one or more input/output devices (e.g., keyboard, a touchscreen, and/or a display), and a network connection. The coupling of the set of processors and other components is typically through one or more busses or bridges (also termed bus controllers). The storage device and signals carrying the network traffic respectively represent one or more non-transitory tangible computer-readable medium and transitory computer-readable communication medium. Thus, the storage device of a given electronic device typically stores code and/or data for execution on the set of one or more processors of that electronic device. Of course, one or more parts of an embodiment of the invention may be implemented using different combination of software, firmware, and/or hardware.

Overview

Split-architecture devices are devices that divide functionality between a data plane and control plane. This division can be strictly within a network element or can involve parts that are both internal and external to the network element, such as a control element that is housed separately from a set of forwarding elements. As used herein, a network element refers to a device that can contain any number of forwarding elements and control elements within a single physical chassis. However, the embodiments are not restricted to implementation within a single network element. The method and system can encompass distributed implementation where forwarding elements and/or control elements housed in separate network elements implement the processes described herein. For example, a controlling element can be in a separate physical chassis from a forwarding element. In one embodiment, the network element can be compliant with the Internet Engineering Task Force (IETF) Forwarding and Control Element Separation (ForCES) protocol suite (as defined by RFC 5810 and RFC 5912). The ForCES protocol suite uses Logical Function Blocks (LFBs) as the unit of description for each forwarding plane element's capabilities. These blocks are used to describe the configuration of the data plane handling in the FE such that the controlling element (CE) can obtain and alter the configuration information of the FE.

Each LFB is specific to an associated FE and the LFB definition includes an English description of the LFB semantics, as well as formal definitions of the ports for receiving and sending packets, the metadata associated with packets, and the parameters of the block that govern what portions of the LFB that the CE can read or write. The definitions in RFC 5810 and 5812 include two special LFBs, the FE Protocol LFB and the FE Object LFB. These are required to be instantiated by each FE, and each FE has exactly one instance of this class of LFB. LFB class definitions are common to all FE and known to the CE. Each FE, either on its own or at the direction of a CE, instantiates (i.e., creates) local instances of LFB classes. Thus, each LFB instance is within a given FE and its particulars are specific to that FE. The class definitions of the LFBs are coded and written description of the functions and variables of the class. In one embodiment, the CE knows a priori the class and instance identifiers (IDs) for the two LFB instances (i.e., the FE Protocol LFB and the FE Object LFB), and can therefore read the information in them, and set information in them to start the interaction with the FE.

The FE Protocol LFB represents information about the protocol interaction between the FE and the CE. This includes information about protocol versions that are supported. The FE Object LFB represents all the information about the FE, such as what LFB classes it supports, what LFB instances currently exist on the FE, and how those instances are interconnected. The ForCES implementation is provided by way of example, however, one skilled in the art would understand that the principles and structures described herein are also applicable to other split-architectures system, and similar split-architecture systems.

The advantages of the embodiments of the method and apparatus for split-architecture capabilities management include that they allow for flexible changes to protocol and forwarding capabilities system-wide (i.e., throughout the network element and/or all related CEs and Fes) without changing the basic protocol mechanisms and structures implemented therein. Device capabilities can be supported with no changes to protocol machinery, and even protocol changes can be easily added. In one embodiment, these advantages are obtained by leveraging mechanisms designed into the ForCES system.

The prior art is limited by many problems and disadvantages that are overcome by the embodiments set forth herein. While ForCES (e.g., as described in RFC 5810) does allow for new versions of the base FE Object LFB, it is difficult to support this, and such changes should only be made to reflect core ForCES changes. Such changes to ForCES require adoption and agreement to new standards that are difficult and time consuming to obtain. Without such fundamental changes the prior art does not offer a mechanism by which an FE can inform the CE that it has certain specific device-wide capabilities. If the capability can be represented by the ability to support a particular LFB class that is case is already defined. However, if the change is more general, such as system-wide parameters that the FE needs to communicate with the CE, then creating a new version of the FE Object LFB is clearly the wrong answer to such a problem. For example, what if the issue is whether new protocol extensions are supported?

The embodiments of the present invention solve these limitations and disadvantages of the prior art. The method and system enable detection of FE capabilities that are represented by the creation of a new LFB class that is tied to the system-wide capabilities for the particular domain of interest. The FE can then create a single instance of this class with whatever instance ID it chooses. The CE can fetch and utilize this information to determine whether the FE supports a particular capability. New LFB definitions are created as XML files conforming to a defined XML schema included in RFC 5812. In this case, the LFBs will be unusual in having no metadata, no packet formats, and no input or output ports.

Thus, in one example application, if one needs to provide information about supported versions of the OpenFlow schema (using the ForCES protocol), one can define an OpenFlow Support LFB, and the FE will create an instance of this which the CE can read (and write, if suitable). Similarly, in another example application, a new LFB can be defined indicating support of a protocol extension to add start and stop times to operations. This is not a new version of the protocol, but a new protocol capability. To indicate the capability, it would suffice for the FE to report that it can support a new LFB class, known to the CE, e.g., one called StartStopTimeProtocol. More likely, this is a family of protocol changes, and a new LFB for the CommissioningInteractionProtocol would be supported, and it would have fields representing the various capabilities that the FE could support, with values reported by the FE in the instance it creates of the LFB to reflect what it actually can do. This method and system using LFBs can be extended to also reflect resource, security, or other system-wide capabilities.

FIG. 1 is a diagram of one embodiment of a network element with a split-architecture. In one embodiment, the network element is a router 101, bridge, or similar networking device. The router 101 can include any number of control elements (CE) 103A, B and any number of forwarding elements (FEs) 109A-C. The CEs 103A, B can communicate with the FEs over a bus 127, inter-connect, or similar communication mechanism. In other embodiments, the CEs can be remote from the router 101 in another router or computing device and can communicate with the FEs over a network 111 or similar communication medium.

In one embodiment, the CEs 103A, B are implemented on line cards in a router or similar components of a network element. In other embodiments, the CEs are implemented by general purpose processors. FIG. 1 shows a set of CEs and FEs encompassing processors and memory, which illustrates that the CEs are implemented as a combination of these resources, which could be disposed on separate line cards, a common mother board, or similarly implemented. As noted above, the CEs and FEs could also be implemented in or distributed across multiple network elements. As noted, each CE 103A, B can be implemented by a processor 123, memory 125, and similar components of a network element. One skilled in the art would understand that CEs can rely on communication interfaces, interconnects, specialized processing devices and similar components that implement the functionality of the CE to control and configure the operations of the router 101 and the FEs 109A-C. The functions include forwarding element (FE) capability management implemented by the FE capability management module 107 to maintain a FE capabilities model 105. The FE capabilities model 105 is a data structure that stores the capabilities of each of the Fes 109A-C. This information can be utilized to configured the FEs 109A-C to process certain types of traffic and to route data traffic to particular FEs to make use of their capabilities.

The FE capability management module 107 can obtain the FE capabilities from each of the respective FEs 109A-C. The FE capability management module 107 can obtain this information as discussed herein below in regard to FIG. 2. The FE capability management module 107 can communicate with a FE capability module 113 on the FE 109A-C to obtain the capability information. Once received, the capability information is stored or updated in the FE capabilities model 105 by the FE capability management module 107. The FE capability management and model can be distributed over multiple CEs 103A, B or both the CEs 103A, B can execute the functions redundantly to provide back-up in case of failure.

Each FE 109A-C can manage the processing and forwarding of data packets received through a set of ports over the network 111. The network 111 can be any type of network including an Internet Protocol network, Ethernet base local area network or similar network. In other embodiments, the router 101 can be connected to multiple networks 111 through different ports of the FEs 109A-C. The FEs 109A-C communicate with CEs 103A, B through a bus 127 or similar communication mechanism. The FEs 109A-C can communicate with each other through a bus 127, switch fabric or similar communication mechanism. The FEs 109A-C forward data packets that are received through their network 111 ports to other FEs 109A-C having network 111 ports that lead to a next hop along a route of each data packet.

As with the CEs discussed above, the FEs 109A-C can be implemented by processors 119, memories 115 and similar components for the processing and forwarding of data packets and similar functions of the FEs 109A-C. The processors 119 and memories 115 can be components of line cards, discrete components of a network element, or shared components of a network element or similarly configured device. The processors 119 can perform level two and level three data packet processing, look-up next hop information in forwarding tables and provide similar routing and forwarding functionality. In one embodiment, the FEs 109A-C instantiate and maintain an FE object which is a data structure that represents the capabilities and/or state of each FE 109A-C. An FE capability module 113 can receive communication and information requests from the control elements 103 through the FE capability module 113 from the FE capability management module 107. In one embodiment, the FE capability module 113 is a specific module for the purpose of FE capability related services. In other embodiments, the FE capability module 113 is implemented as a more general process that is applied to this function. For example, the FEs 109A-C can implement the ForCES protocol that enables the CEs 103A, B to request or access data from the FE object 117. In this example, the CEs 103A, B use the standard ForCES protocol features to access a list of LFBs supported or instantiated by each FE 109A-C where the FE capability management module 107 is aware of the correspondence of these LFBs to particular FE capabilities.

The FE object 117 and the FE capability module 113 can be stored in the memory 115 of the FE 109A-C. The memory 115 can be a general purpose memory for data processing by the processor 119 or can be a specialized storage space specifically for the storage of the FE object 117 and/or the FE capability module 113. Each FE can have a similar hardware configuration or can have distinct hardware implementations that each support the communication with the FE capability management module 107 using ForCES or similar protocols.

Figure 2:
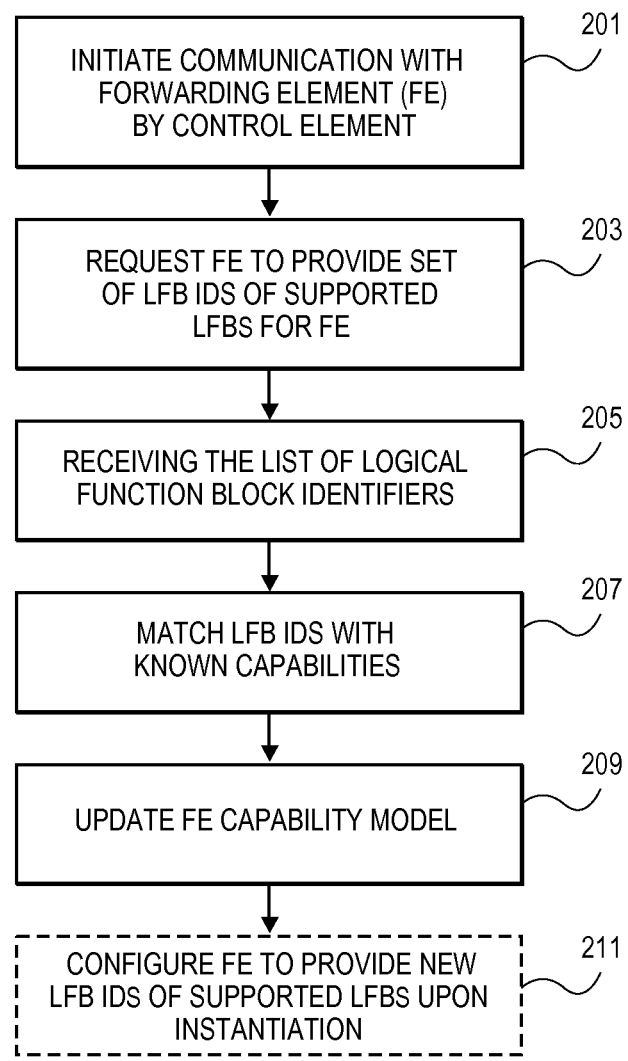
FIG. 2 is a flowchart of one embodiment of a process for determining forwarder capabilities.

FIG. 2 is a flowchart of one embodiment of a process for determining forwarding element capabilities in a network element. In one embodiment, the process is initiated by the control element starting communication with each forwarding element in a network element (Block 201). The control element can iterate through each of the forwarding elements, or communicate with them in parallel. For sake of clarity, the process of communicating with a single forwarding element is described. However, one skilled in the art would understand that the process and principles described herein in regard to the communication with a single forwarding element can be applied to communicating and collecting the capabilities of multiple forwarding elements. Similarly, the communication between the control element and the forwarding element is described herein as within a single network element, for example over a bus or similar interconnect. However, the process and principles are also applicable to communication between control elements and forwarding elements that are in separate network elements or computing devices that are connected over a network through any number of intermediate computing and networking devices.

In one example embodiment, the communication between the control element and the forwarding element utilizes the ForCES protocol to enable the control element to exchange data and read and write data structures of the forwarding element. In remote embodiments, a protocol such as ForCES can be combined with general networking protocols and encapsulation to enable communication between the forwarding element and the control element. Initiating communication can take the form of opening a communication channel between the forwarding element and control element. In other embodiments, the initiating of communication can be a discovery process, configuration process or similar process by which the control element becomes aware and is able to address the forwarding element.

The control element can send a request to the forwarding element for it to provide a set of logical function block identifiers of the logical function blocks that are supported or instantiated by the forwarding element (Block 203). As described above, logical function blocks are used to describe functions or operations to be performed for a defined set of traffic and ports. However, these logical function blocks can be created to represent specific capabilities as well as parameters of these capabilities. Such logical function blocks will not have port definitions and similar data and the capabilities being represented must be known to the FE capability management module of the control element. A list of the identifiers of the instantiated or supported logical function blocks is maintained in a FE object of each forwarding element. The list of identifiers is accessible to the control element and can be provided upon request (Block 205). In other embodiments, these identifiers can be provided without being specifically requested by the control elements. Instead, the forwarding elements automatically provide the list of identifiers at system start up and/or as each logical function block is instantiated or added.

After receiving the list of logical function block identifiers, a check is made to determine if any of the identifiers match a known capability for a forwarding element (Block 207). Capabilities can be known by administrative configuration or similar provisioning. Any number of different capabilities can be defined in this manner. Similarly if the capabilities encompass a set of parameters, this additional data can be retrieved from the FE object or the data can be provided at the same time as the list of identifiers. This received data is then utilized to update the capabilities associated with the forwarding element in the FE capabilities model maintained by the control element (Block 209). The FE capabilities model can be any type or size of data structure that can track the capabilities of a particular forwarding element or any number of forwarding elements.

In the case where the control element is configured to request the capabilities data at the time of start-up or initialization, then the control element can also configure the forwarding element to notify the control element if any new or additional capabilities are instantiated or added to the forwarding element (Block 211). New or additional capabilities can be based on updated firmware or similar software of the forwarding element, changes in configuration of the forwarding element and similar events. In other embodiments, the control element can periodically poll the forwarding elements to determine whether new capabilities are present.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a network element for determining and configuring of capabilities of network element components, the network element components including a set of control elements where the set of control elements determines capabilities of each of a set of forwarding elements, the method comprising the steps of:
    initiating communication with a forwarding element in the set of forwarding elements by a control element in the set of control elements;
    requesting, by the control element, the forwarding element to provide a set of logical function block identifiers of supported logical function blocks for the forwarding element;
    receiving the set of logical function block identifiers from the forwarding element in response to the request;
    matching the set of logical function block identifiers with known forwarding element capabilities to determine capabilities of the forwarding element; and
    updating a forwarding element capability model with the capabilities of the forwarding element.

2. The method of claim 1, further comprising the step of:
    configuring the forwarding element to provide new logical function block identifiers of supported logical function blocks upon instantiation of new logical function blocks.

3. The method of claim 1, further comprising the step of:
    receiving capability parameters from at least one logical function block in response to the request.

4. The method of claim 1, further comprising the step of:
polling periodically, by the control element, the forwarding element to determine whether additional logical function blocks representing forwarding element capabilities have been instantiated.

5. The method of claim 1, further comprising the step of:
retrieving, by the forwarding element, the set of logical function block identifiers from a forwarding element object to be returned to the control element.

6. The method of claim 1, wherein the forwarding element is a component of the network element.

7. The method of claim 1, wherein the forwarding element is a component of another network element in communication with the network element over a network connection.

8. A network element implementing a process for determining and configuring of capabilities of network element components, the network element components including a set of control elements where the set of control elements determines capabilities of each of a set of forwarding elements, the network element comprising:
   a memory to store a forwarding element capability model, the forwarding element capability module to store capabilities of each forwarding element in the set of forwarding elements; and
   a processor coupled to the memory, the processor to execute a forwarding element capability management module, the forwarding element capability management module to initiate communication with a forwarding element in the set of forwarding elements, to request the forwarding element to provide a set of logical function block identifiers of supported logical function blocks for the forwarding element, to receive the set of logical function block identifiers from the forwarding element in response to the request, to match the set of logical function block identifiers with known forwarding element capabilities to determine capabilities of the forwarding element, and to update a forwarding element capability model with the capabilities of the forwarding element.

9. The network element of claim 8, wherein the forwarding element capability management module is further configured to configure the forwarding element to provide new logical function block identifiers of supported logical function blocks upon instantiation of new logical function blocks.

10. The network element of claim 8, wherein the forwarding element capability management module is further configured to receive capability parameters from at least one logical function block in response to the request.

11. The network element of claim 8, wherein the forwarding element capability management module is further configured poll periodically the forwarding element to determine whether additional logical function blocks representing forwarding element capabilities have been instantiated.

12. The network element of claim 8, further comprising:
   a forwarding element capability module configured to retrieve the set of logical function block identifiers from a forwarding element object to be returned to the control element.

13. The network element of claim 8, wherein the forwarding element is a component of the network element.

14. The network element of claim 8, wherein the forwarding element is a component of another network element in communication with the network element over a network connection.

* * * * *